United States Patent [19]

Kwok

[11] Patent Number: 5,786,826
[45] Date of Patent: Jul. 28, 1998

[54] METHOD AND APPARATUS FOR PARALLEL RASTERIZATION

[75] Inventor: Thomas Yu-Kiu Kwok, Washington Township, N.J.

[73] Assignee: International Business Machines Corporation, Armonk, N.Y.

[21] Appl. No.: 592,046

[22] Filed: Jan. 26, 1996

[51] Int. Cl.$^6$ .................................................. G06F 15/80
[52] U.S. Cl. ........................... 345/505; 345/419; 345/423
[58] Field of Search .................................. 395/501–506, 395/522, 118–127

[56] References Cited

U.S. PATENT DOCUMENTS

| | | | |
|---|---|---|---|
| 4,945,500 | 7/1990 | Deering | 395/122 |
| 4,949,280 | 8/1990 | Littlefield | 395/505 |
| 5,129,051 | 7/1992 | Cain | 395/133 |
| 5,157,765 | 10/1992 | Birk et al. | 395/506 |
| 5,325,485 | 6/1994 | Hochmuth et al. | 395/505 |

OTHER PUBLICATIONS

U. Neumann, "Parallel volume rendering algorithm performance on mesh connected multicomputers", Proc. of IEEE Parallel Rendering Sym. San Jose, CA 25–26 Oct. 1993.

S. Whitman, "A task adaptive parallel graphics renderer", Proc. of IEEE Parallel Rendering Sym. San Jose, CA. 25–26 Oct. 1993 San Jose, CA 25–26 Oct. 1993.

D. Ellsworth, "A multicomputer polygon rendering algorithm for interactive applications". Proc. of IEEE Parallel Rendering Sym. San Jose, CA. 25–26 Oct. 1993.

Gupta et al, "A VLSI Architecture for Updating Raster–Scan Displays" Computer Graphics, vol. 15, #3 Aug. 1981, pp. 71–78.

H. Fuchs et al "Fast Spheres, Shadows, Textures, Transparencies, and Image Enhancements in Pixel-Planes" SIGGRAPH '85, pp. 111–120 v.19 #3.

*Primary Examiner*—Raymond J. Bayerl
*Assistant Examiner*—U. Chauhan
*Attorney, Agent, or Firm*—Jay P. Sbrollini

[57] ABSTRACT

Graphics systems manipulate data embodying one or more objects for display. The objects are typically represented by a plurality of faces. In order to rasterize an object for display utilizing a plurality of rasterization engines, the present invention partitions at least one face of the object into a plurality of sub-faces according to a first cost function representing cost of rasterizing the face, and assigns the sub-faces to the plurality of rasterization engines for rasterization. The rasterization engines rasterize the sub-faces to generate pixel data representing the object for display. The partitioning of the face of the object into the plurality of sub-faces may be based upon a second cost function representing cost of rasterizing at least one of the sub-faces. Preferably, each of the sub-faces has equal rasterization cost and each of the sub-faces do not overlap one another.

36 Claims, 9 Drawing Sheets

METHOD AND APPARATUS FOR PARALLEL RASTERIZATION

BACKGROUND OF THE INVENTION

1. Technical Field

This invention relates generally to a computer graphics system for processing and displaying graphical data representing three-dimensional objects and, more particularly, to the rasterization of the objects for display.

2. Description of the Related Art

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object. Rendering the scene for display on the two-dimensional display device is a computationally intensive process. It is therefore frequently a slow process, even with today's microprocessors and graphics processing devices.

Figure 1A:
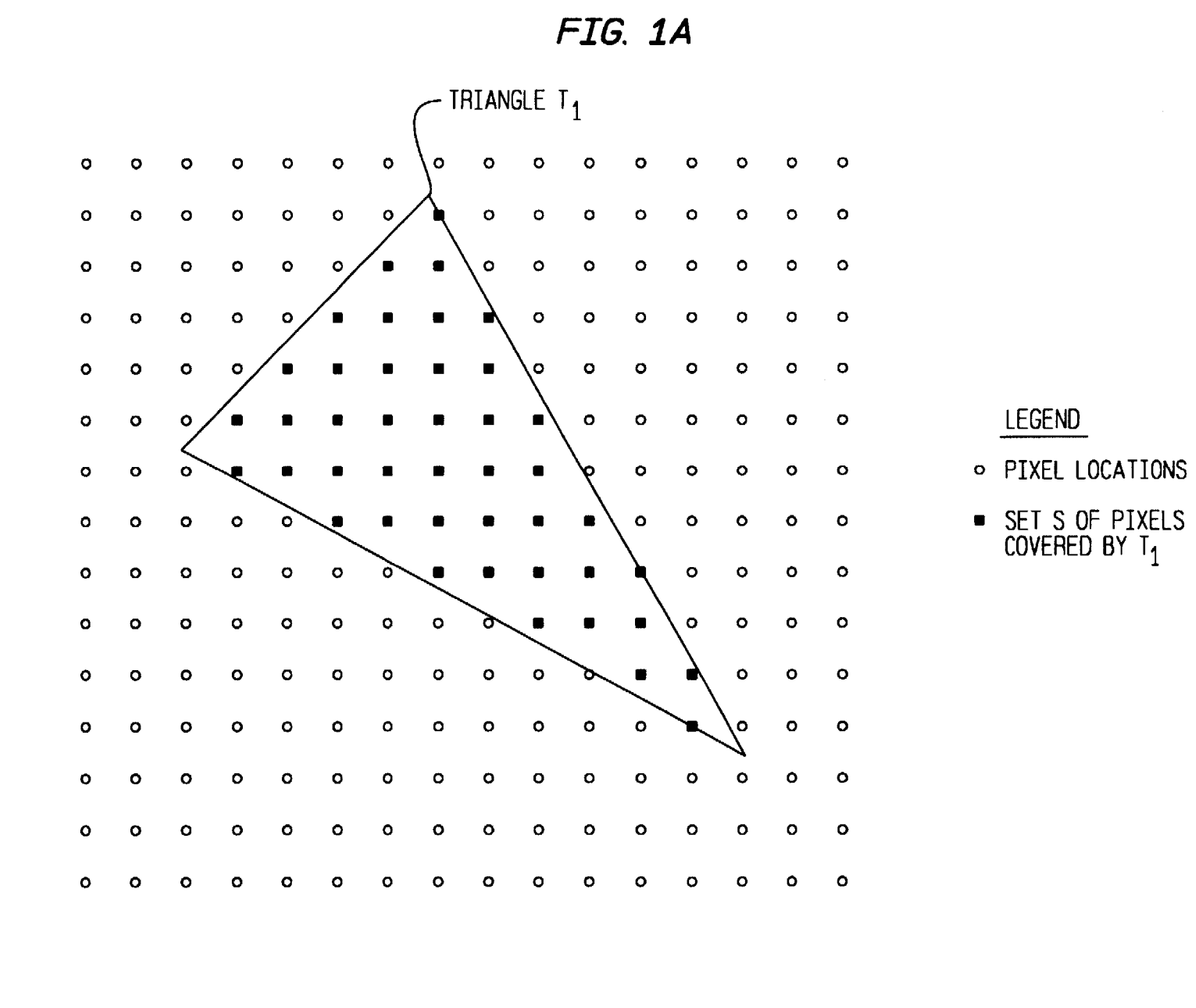
FIG. 1A is a pictorial representation of the rasterization of a triangle T1.

Rasterization is the process which converts the simple, geometric description of a graphics primitive into pixels for display. A typical primitive, as shown in FIG. 1A, is a triangle $T_1$. Other area or surface primitives conventionally are converted into one or more triangles prior to rasterization. The triangle $T_1$ is represented by the (x,y,z) coordinates and other properties (such as colors and texture coordinates) at each of its vertices. The (x,y) coordinates of a vertex tell its location in the plane of the display. The z coordinate tells how far the vertex is from the selected view point of the three-dimensional scene. Rasterization may be divided into three tasks: scan conversion, shading, and visibility determination.

Scan conversion utilizes the (x,y) coordinates of the vertices of each triangle to compute a set of pixels S which cover the triangle.

Shading computes the colors of each pixel in the set S. There are numerous schemes for computing colors, some of which involve computationally intensive techniques such as texture mapping.

Figure 1B:
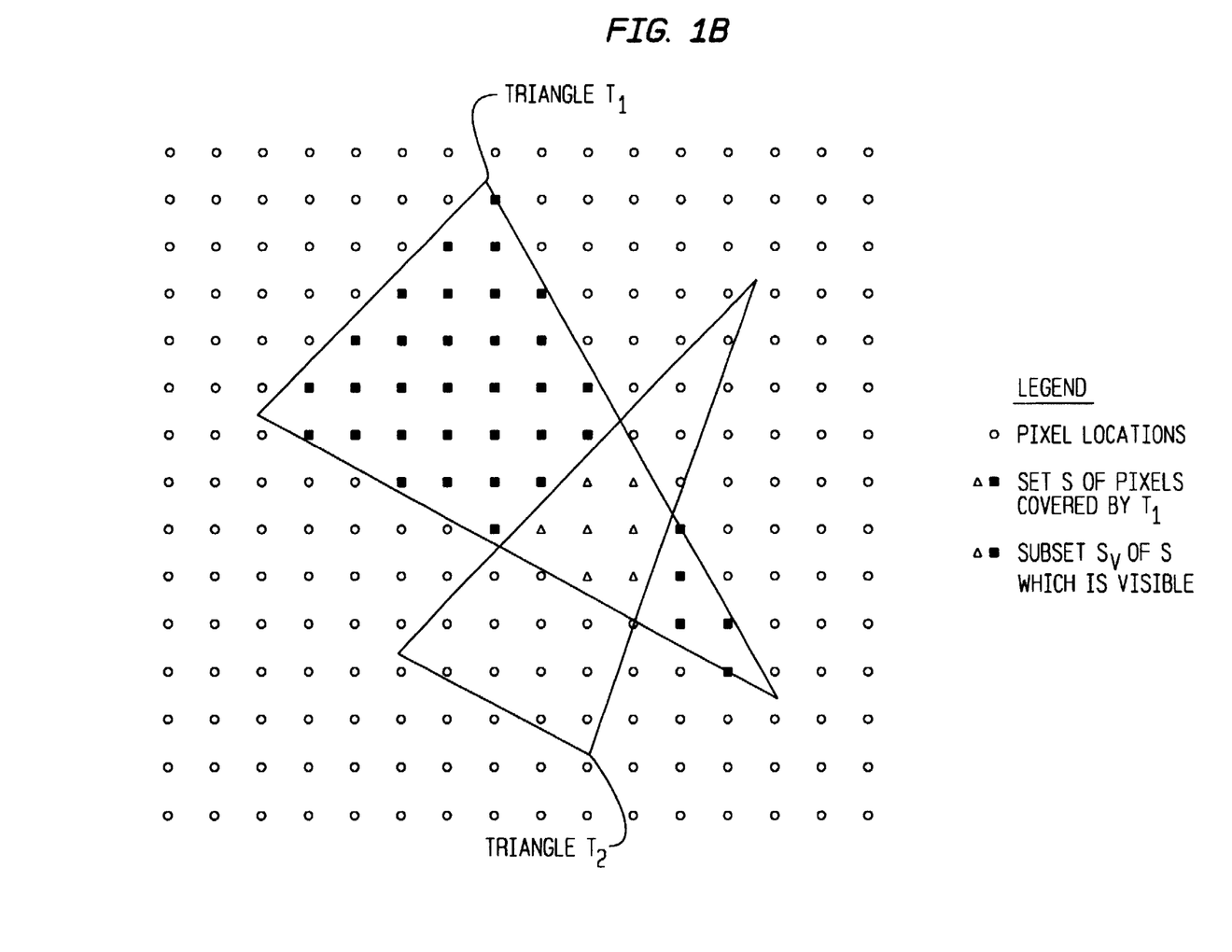
FIG. 1B is a pictorial representation of the rasterization of triangles T1 and T2, wherein triangle T1 is partially hidden by triangle T2.

Visibility determination utilizes the z coordinate, also called the depth value, of each pixel to compute the set of pixels $S_v$ (a subset of S) which are "visible" for the triangle. The z coordinate of each pixel may be determined by interpolation between the z coordinate specified for each vertex of the triangle. The set $S_v$ will differ from the set S if any of the pixels in set S cover the previously rasterized triangles whose z values are closer to the selected view point. Thus, for each triangle in the scene, a pixel is "visible" if it is in the set $S_v$ or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, T1 and T2, wherein triangle T1 is partially hidden by triangle T2.

Moreover, the rasterization process may include lighting calculations that simulate the effects of light sources upon the surfaces of the triangles of the scene. Typically, the position of each triangle is identified by (x,y,z) coordinates of a set of three vertices, with each vertex having a reflectance normal vector with the vertex at its origin. The reflectance normal vectors of each triangle along with information about the position of the light sources are used to calculate the effect of the light sources on the color values determined during the shading calculations for each triangle.

Rasterization is completed by writing the colors of the set of visible pixels $S_v$ to an image buffer for display, and writing the z coordinate of the set of visible pixels $S_v$ to a Z-buffer.

Rasterization is typically the bottleneck in the rendering process. One strategy to overcome the rasterization bottleneck is to employ multiple processor architectures. One example of such an architecture is found in U.S. Pat. No. 4,945,500 to Deering wherein a plurality of polygons (triangles) are rasterized in parallel by multiple processors each assigned to one of the polygons. However, this architecture does not evenly balance the load of rasterizing the polygons among the processors when one or more of the polygons that lies within the viewing frustrum covers a substantially greater number of pixels than other polygons that lie within the viewing frustrum. In this case, one or more of the processors may be idle, which eliminates much of the intended performance benefits that the architecture is intended to provide. Moreover, such an architecture must provide a mechanism to write the contribution of the visible portions of the polygons to the frame buffer during the parallel rasterization process to account for the possibility that portions of two or polygons that are being rasterized concurrently overlap one another. Such a mechanism may, for example, resolve contention to a common z-buffer. Importantly, this mechanism adds complexity and expense to the architecture.

Another multiple processor architecture may be found in Fuchs et. al., "Fast Spheres, Shadows, Textures, Transparencies and Image Enhancements in Pixel-Planes," Computer Graphics, Vol. 19, No. 3, pg. 111–120 (July 1985) wherein graphics primitives from a host computer are broadcast to an array of processors each responsible for processing one (or few) pixels for display. However, such an architecture is expensive to implement because it requires one processor/pixel.

Thus, there is a need in the art for a parallel rasterization mechanism that is efficient, cost-effective, and provides for even load balance in the parallel rasterization of a plurality of primitives.

SUMMARY OF THE INVENTION

The above-stated problems and related problems of the prior art are solved with the principles of the present invention, method and apparatus for parallel rasterization. The method and apparatus of the present invention may be used in graphics systems wherein objects are each represented by a plurality of faces. In order to rasterize such objects for display utilizing a plurality of rasterization engines, the present invention partitions at least one face of the object into a plurality of sub-faces according to a first cost function representing cost of rasterizing the face, and assigns the sub-faces to the plurality of rasterization engines for rasterization. The rasterization engines rasterize the sub-faces to generate pixel data representing the object for display. The partitioning of the face of the object into the plurality of sub-faces may be based upon a second cost function representing cost of rasterizing at least one of the sub-faces.

Preferably, each of the sub-faces has equal rasterization cost and each of the sub-faces do not overlap one another. This provides for efficient load balance among the rasterization engines and avoids z-buffer contention, thus reducing the complexity and cost of the system.

DETAILED DESCRIPTION OF THE PRESENT INVENTION

Figure 2:
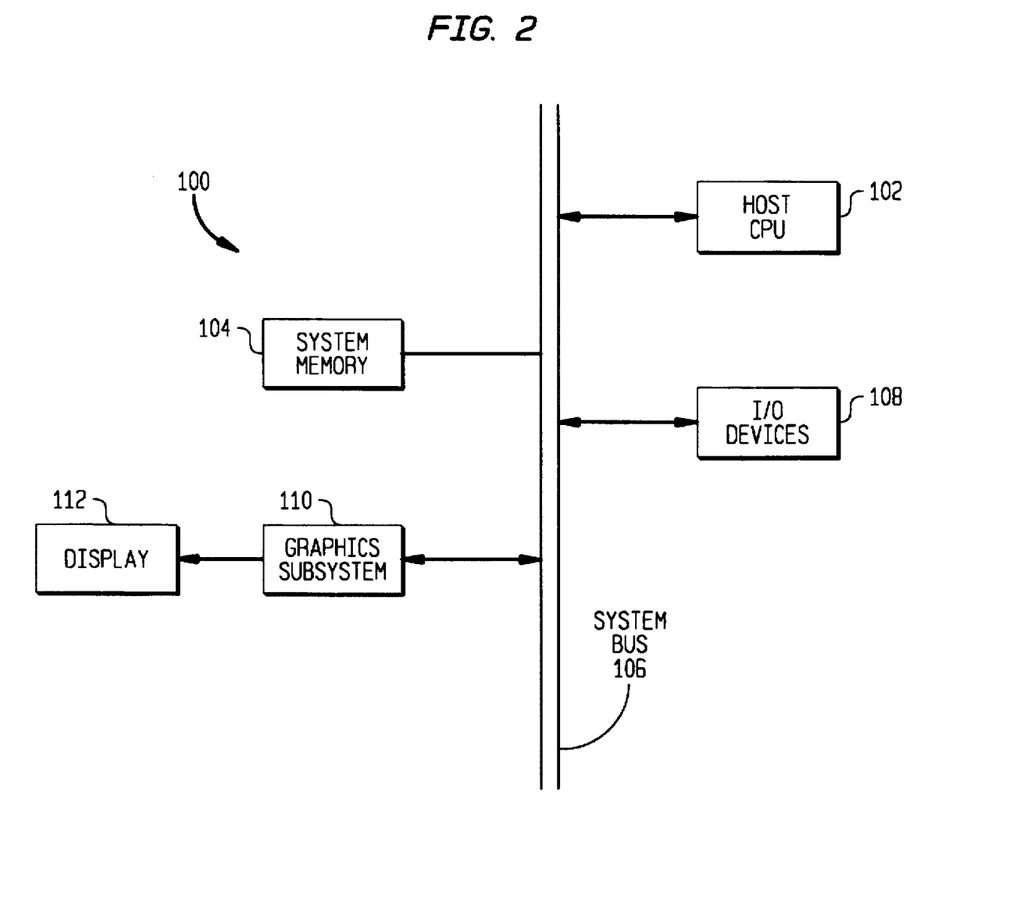
FIG. 2 is a functional block diagram of a graphics work station.

As shown in FIG. 2, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene. Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile. storage such as a hard disk or CD-ROM for storing the graphics data and any application software. As is conventional, the graphics data and application software is loaded from the non-volatile storage to the system memory 104 for access by the system processor 102.

Figure 3:
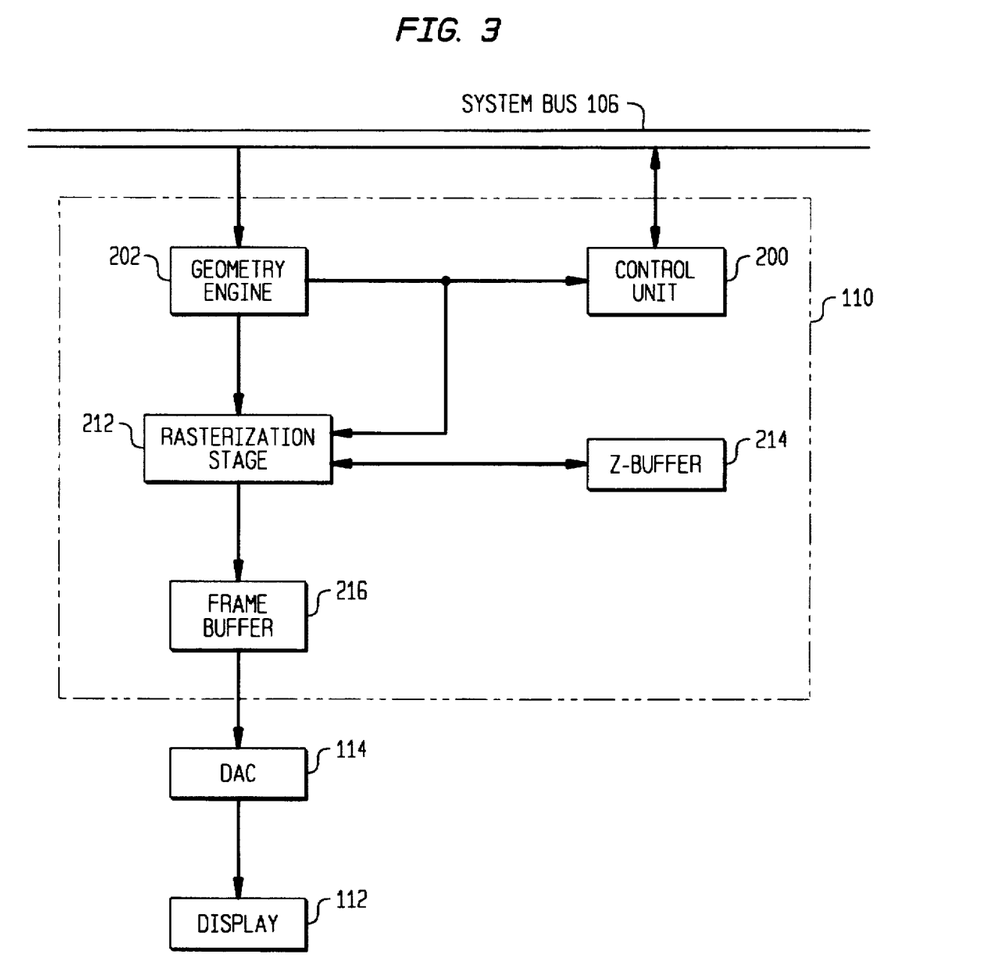
FIG. 3 is a functional block diagram of a graphics subsystem of the graphics work station of FIG. 2.

The graphics system 100 also includes a graphics subsystem 110 that interfaces to the system memory 104 via the system bus 106. Generally, the graphics subsystem 110 operates to render the graphics data stored in the system memory 104 for display on a display area of a display device 112 according to graphics orders transferred from the host processor 102 to the graphics subsystem 110. The display device 112 may utilize raster scan techniques or liquid crystal display techniques to display the pixels. The pixel data generated by the graphics subsystem 110 is in digital form. Typically, the display device 112 requires the pixel data in analog form. In this case, as shown in FIG. 3, a digital-to-analog converter 114 may be placed between the graphics subsystem 110 and the display device 112 to convert the pixel data from a digital to an analog form.

The graphics orders typically are generated by application software that are stored in the system memory 104 and executed by the system processor 102. The graphics orders typically consist of a sequence of data blocks that include, or point to, the graphics data (e.g. coordinates and attributes of one or more objects) that defines the objects of the scene, associated transformation matrices, and any other necessary information required by the graphics subsystem 110. The primitives associated with the graphics orders are typically defined by the value of the geometric coordinates or homogeneous coordinates for each vertex of the primitive. In addition, graphics orders typically include, or point to, data defining the reflectance normal vectors for the vertices of each primitive. The values of these coordinates and normal vectors are assumed to be specified in a coordinate system designated as the model coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety.

In the alternative, the graphics subsystem 110 (or portions thereof) as described below may be implemented in software together with a processor. The processor may be a conventional general purpose processor, a part of the host processor 128, or part of a co-processor integrated with the host processor 128.

More specifically, as shown in FIG. 3, the graphics subsystem 110 includes a control unit 200 that supervises the operation of the graphics subsystem 110. Upon receiving a graphics order to render a scene, the control unit 200 passes the graphics data associated with the graphics order on to a geometry engine 202. The geometry engine 202 transforms the graphics data associated with the graphics order from the model coordinate system to a normalized device coordinate system designated the view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization state 212 that converts the transformed primitives into pixels, and generally stores each primitive's contribution at each pixel in at least one frame buffer 216 and a z-buffer 214. The pixel data is periodically output from the frame buffer 216 for display on the display device 112. The functionality of the geometry engine 202 and rasterization stage 212 may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

Figure 4:
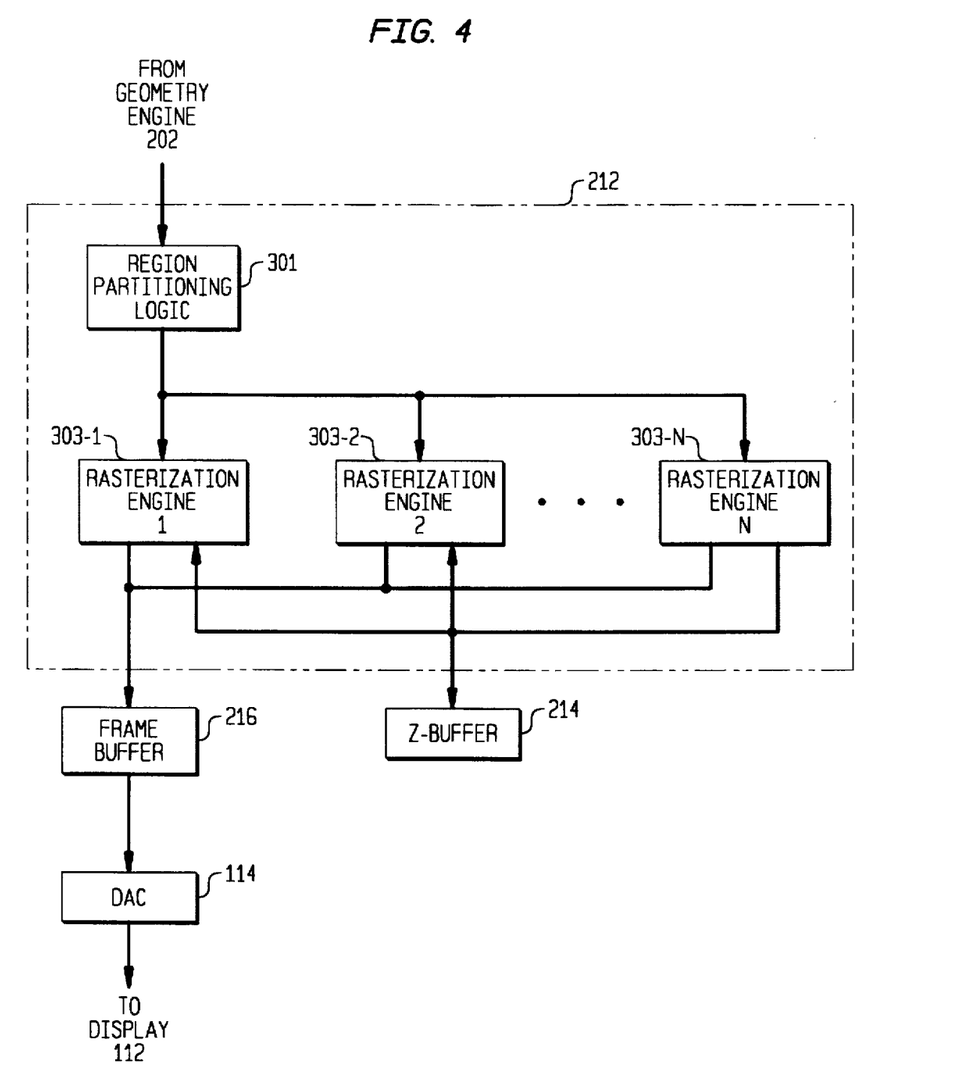
FIG. 4 is a functional block diagram of the rasterization stage of FIG. 3 according to the present invention.

According to the present invention, a parallel rasterization mechanism is provided that may be integrated into the graphics subsystem 110. As shown in FIG. 4, the parallel rasterization mechanism of the present invention includes region partitioning logic 301 coupled to a plurality of rasterization engines 303-1, 303-2, . . . 303-N. Each of the rasterization engines is coupled to the Z-buffer 214 and at least one frame buffer 216. The Z-buffer 214 preferably contains sufficient memory to store a depth value for each pixel of the display 112. Conventionally, the depth value is stored as a 24-bit integer for each pixel. Frame buffer preferably contains sufficient memory to store color data for each pixel of the display 112. Conventionally, the color data consists of three 8-bit integers representing red, green and blue (r,g,b) color values for each pixel.

Figure 5:
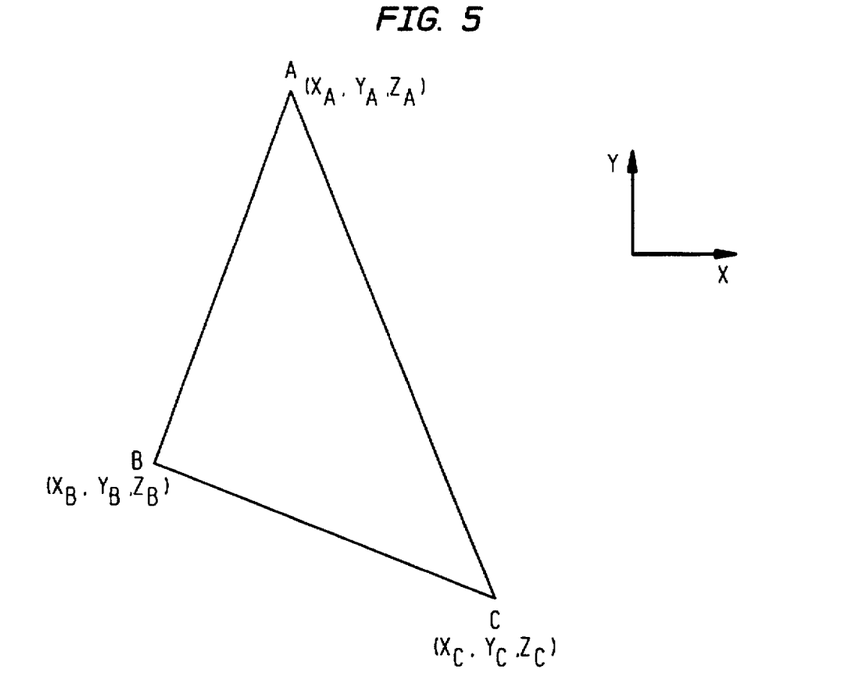
FIG. 5 illustrates a triangle ABC represented by data supplied to the region partitioning logic of FIG. 4.

The region partitioning logic 301 partitions each primitive supplied by the geometry engine 202 into a plurality of regions each having an equal cost of rasterization. Preferably, the regions do not overlap one another. The regions are allocated to a plurality of rasterization threads for parallel rasterization by the engines 303-1, 303-2, . . . 303-N. Consider an example wherein each primitive supplied by the geometry engine 202 is a generalized triangle ABC as shown in FIG. 5, and the region partitioning logic 301 partitions each triangle into M non-overlapping regions each having an equal cost of rasterization. In this scenario, the region partitioning logic 301 preferably operates as described below and illustrated in FIG. 6.

Figure 6:
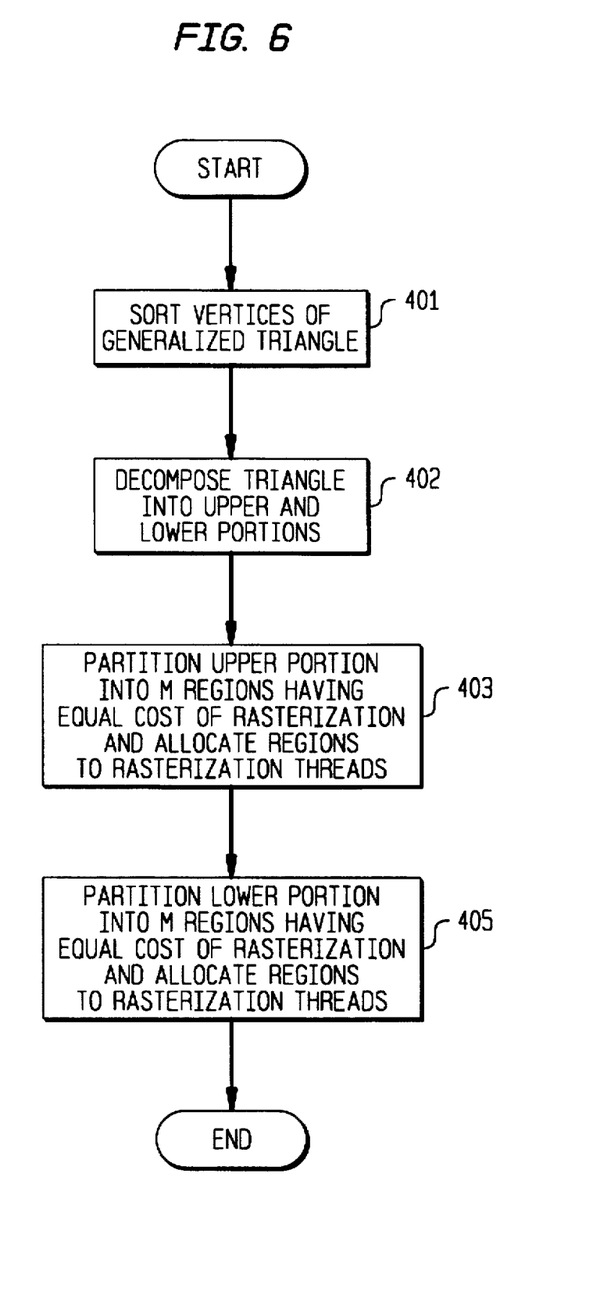
FIG. 6 is a flow chart illustrating operation of the region partitioning logic of FIG. 4 according to the present invention.
Figure 7:
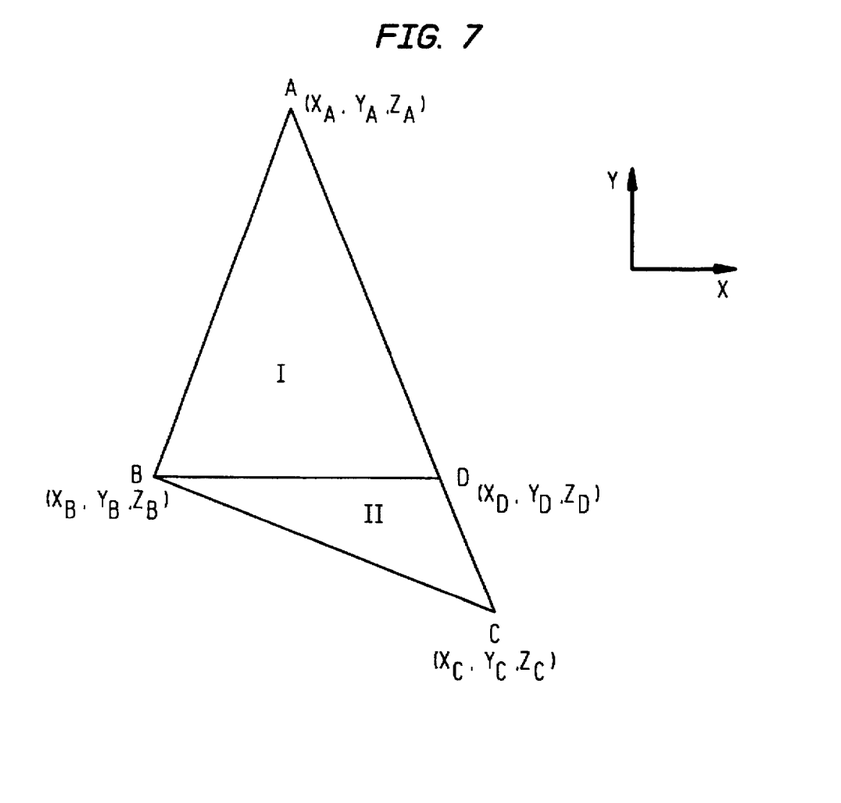
FIG. 7 illustrates the decomposition of the triangle ABC into an upper portion ABD and a lower portion CBD performed by the region partitioning logic of FIG. 4.

In step 401, the region partitioning logic 301 begins by sorting the vertices of the generalized triangle ABC by their y coordinates. As illustrated in FIG. 7, vertex A has the highest y coordinate and vertex C has the lowest y coordinate.

In step 402, the region partitioning logic 301 decomposes the generalized triangle ABC into an upper portion ABD and lower portion CBD by a horizontal line parallel to the x-axis as shown in FIG. 7. Preferably, the x coordinate, $X_D$, and the y coordinate, $Y_D$, of the vertex D of the upper and lower portions is determined as follows.

The equation of a line can be written in the form:

$$x = my + c \quad (1)$$

where m is the slope of the line and c is the intercept of the line on the x-axis.

Thus, line AB may be written as:
And line AC may be written as:

$$x = m_{AB}y + c_{AB} \quad (2)$$

$$\text{where } m_{AB} = \frac{x_A - x_B}{y_A - y_B}$$

$$c_{AB} = \frac{y_A x_B - y_B x_A}{y_A - y_B}$$

$$x = m_{AC}y + c_{AC} \quad (3)$$

$$\text{where } m_{AC} = \frac{x_A - x_C}{y_A - y_C}$$

$$c_{AC} = \frac{y_A x_C - y_C x_A}{y_A - y_C}$$

The y coordinate, $Y_D$ of the vertex D is equated to the y coordinate $Y_B$ of the vertex B. And the x coordinate, $x_D$, of the vertex D may be calculated as follows:

$$x_D = m_{AC} y_D + c_{AC} \quad (4)$$

The z coordinate as well as the attributes (e.g. color, reflectance, texture, fog and others) of vertex D may also be determined by interpolation as follows. The z coordinate of the vertex D, designated $z_D$, can be written as a function of x and y:

$$z_D(x,y) = lx + my + n \quad (5)$$

where l,m, and n are constants which can be determined by substituting the x,y,z values of the vertices A,B,C into equation (1). Thus, $$z_A(x,y) = lx_A + my_A + n \quad (6a)$$

$$z_B(x,y) = lx_B + my_B + n \quad (6b)$$

$$z_C(x,y) = lx_C + my_C + n \quad (6c)$$

Solving equations (6a)–(6c) yields:

$$l = \frac{(z_B - z_A)(y_C - y_A) - (z_C - z_A)(y_B - y_A)}{(x_B - x_A)(y_C - y_A) - (x_C - x_A)(y_B - y_A)} \quad (7a)$$

$$m = \frac{(z_C - z_A)(x_B - x_A) - (z_B - z_A)(x_C - x_A)}{(y_C - y_A)(x_B - x_A) - (y_B - y_A)(x_C - x_A)} \quad (7b)$$

And substituting l and m into equation (6a) yields:

$$n = z_a - lx_A - my_A \quad (7c)$$

The value of $z_D$ may then be calculated either from equation (1) or (2) as follows:

$$z_D = lx_D + my_D + n \quad (8a)$$

or $$z_D = z_A + l(x_D - x_A) + m(y_D - y_A) \quad (8b)$$

Similar calculations may be made to interpolate the value of other attributes associated with the vertex D.

In step 403, the region partitioning logic 301 partitions the upper portion ABD into M regions having equal cost of rasterization and allocates the M regions to rasterization threads for parallel rasterization by the rasterization engines 303-1, 303-2, . . . 303-N. Preferably, the M regions do not overlap one another. An example of the operation of the region partitioning logic 301 in partitioning the upper portion ABD into M non-overlapping regions having equal cost of rasterization is set forth below with respect to FIG. 8.

In step 405, the region partitioning logic 301 partitions the lower portion CBD into M regions having equal cost of rasterization and allocates the M regions to rasterization threads for parallel rasterization by the rasterization engines 303-1, 303-2, . . . 303-N. Preferably, the M regions do not overlap one another. An example of the operation of the region partitioning logic 301 in partitioning the lower portion CBD into M non-overlapping regions having equal cost of rasterization is set forth below.

If the generalized triangle ABC includes an edge parallel to the x-axis, the operation of the region partitioning logic 301 may be modified to omit steps 401 and 405 and perform only step 403. In addition, the number of regions may correspond to the number of rasterization threads, but the present invention is not limited in this respect. Moreover, each rasterization thread corresponds to a particular rasterization engine. For example, consider the case where the number of rasterization engines and threads N corresponds to the number of regions M generated by the region partitioning logic 301. In this case, the data associated with region 1 may be allocated to thread 1, the data associated with region 2 may be allocated to thread 2, and so on such that the data associated with region M is allocated to thread N.

The data associated with each region is forwarded to the rasterization engine that corresponds to the thread allocated to the particular region. For example, consider the case described above. In this case, the data associated with region 1 is forwarded to rasterization engine 1, the data associated with region 2 is forwarded to rasterization engine 2, and so forth such that the data associated with region M is forwarded to rasterization engine N. Each rasterization engine utilizes the data associated with the region to determine the contribution of the region to the pixels of the display, thereby writing the color of the set of visible pixels of the region to the frame buffer, and writing the z coordinate of the set of visible pixels of the region to the Z-buffer. An example of the method and apparatus for the rasterization of the regions is set forth in Foley et. al., "Computer Graphics: Principles and Practice", pp. 92–99, 668–672, 736–741, 870–871, 882–886, 855–920 (2nd Ed. 1990), herein incorporated by reference in its entirety. In the preferred embodiment as described above, the regions do not overlap one another. This avoids the possibility that two or more of the rasterization engines 1 . . . M will contend with the same location in the Z-buffer and reduces the complexity and cost of the system.

As is conventional, the frame buffer stores pixel data that represents the color of each pixel of the display device. The pixel data is periodically output from the frame buffer for display on the display device. In addition, the graphics subsystem 110 may include more than one frame buffer. As is conventional, one of the frame buffers serves as the active display portion, while another one of the frame buffers may be updated for subsequent display. Any one of the frame buffers may change from being active to inactive in accordance with the needs of the system; the particular manner in which the changeover is accomplished is not relevant to the present invention.

Figure 8:
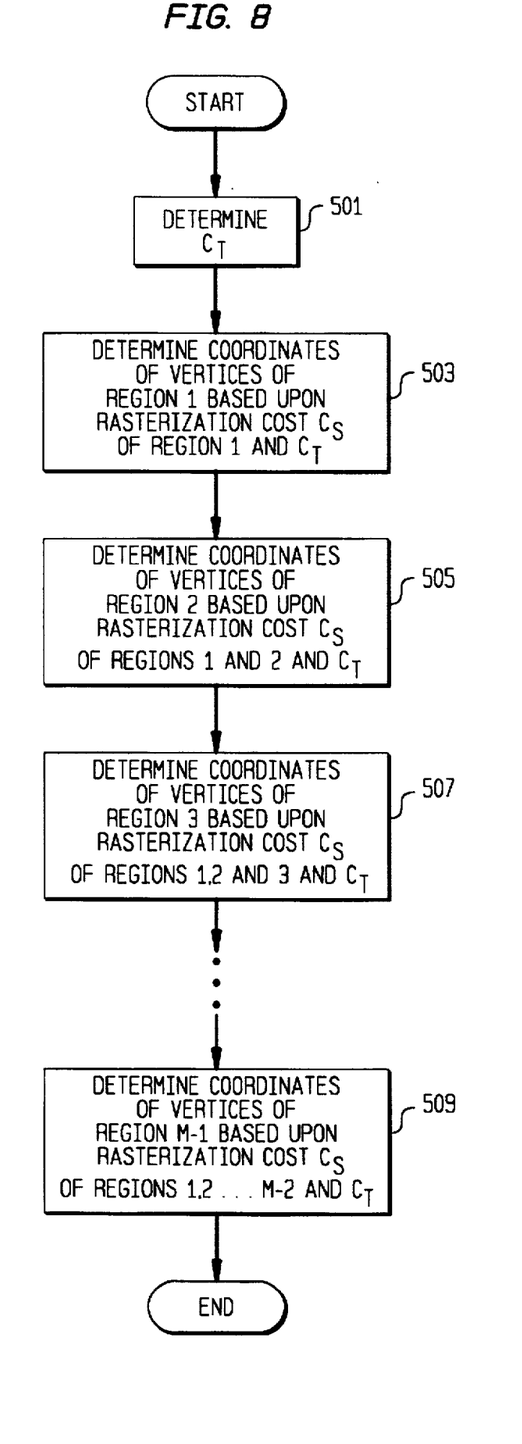
FIG. 8 is a flow chart illustrating operation of the region partitioning logic in partitioning the upper portion ABD into M regions according to the present invention.

FIG. 8 illustrates an example of the operation of the region partitioning logic 301 in partitioning the upper portion ABD into non-overlapping regions 1, 2, . . . M each having equal cost of rasterization. In step 501, the region partitioning logic begins by determining the cost $C_t$ for rasterizing the upper portion ABD. $C_t$ may be expressed as follows:

$$C_t = C_l \times N_l + C_p \times N_p \qquad (9)$$

where $C_l$ is the cost of rasterizing a given scan line and $C_p$ is the cost of rasterizing a given pixel, and where $N_l$ is the total number of scan lines in the upper portion ABD and $N_p$ is the total number of pixels in the upper portion ABD.

For a triangle of height h and width w, the cost $C_t$ may be expressed as follows:

$$C_t = C_l \times h \times n_l + C_p \times \frac{1}{2} \times h \times w \times n_l \times n_k \qquad (10)$$

where $n_l$ is the number of scan lines per unit height and $n_p$ is the number of pixels per unit length.

The height h and width w of the upper portion ABD may be determined as follows:

$$h = y_A - y_B \qquad (11)$$

$$w = x_D - x_B \qquad (12)$$

In step 503, the region partitioning logic 301 determines the coordinates and attributes of the vertices of region 1 based upon the rasterization cost $C_s$ of region 1 and the cost $C_t$. The rasterization cost $C_s$ associated with a given number of regions may be expressed as:

$$C_s = \frac{q}{N} \times C_t + \sum_{i=1}^{q} C_e^i \qquad (13)$$

where q is the given number of regions (q=1 for region 1, q=2 for regions 1 and 2, etc.), and $C_e^i$ is an adjustment cost associated with region i if the rasterization of region i does not start at the same time as the rasterization of the other regions of the upper portion.

Thus, $C_e^i$ may be negative or positive, but the sum of $C_e^i$ over all the regions (I=1, 2 . . . N) is zero. If the rasterization of all the regions of the triangle start at the same time, $C_e^i$=0 for all the regions.

Figure 9:
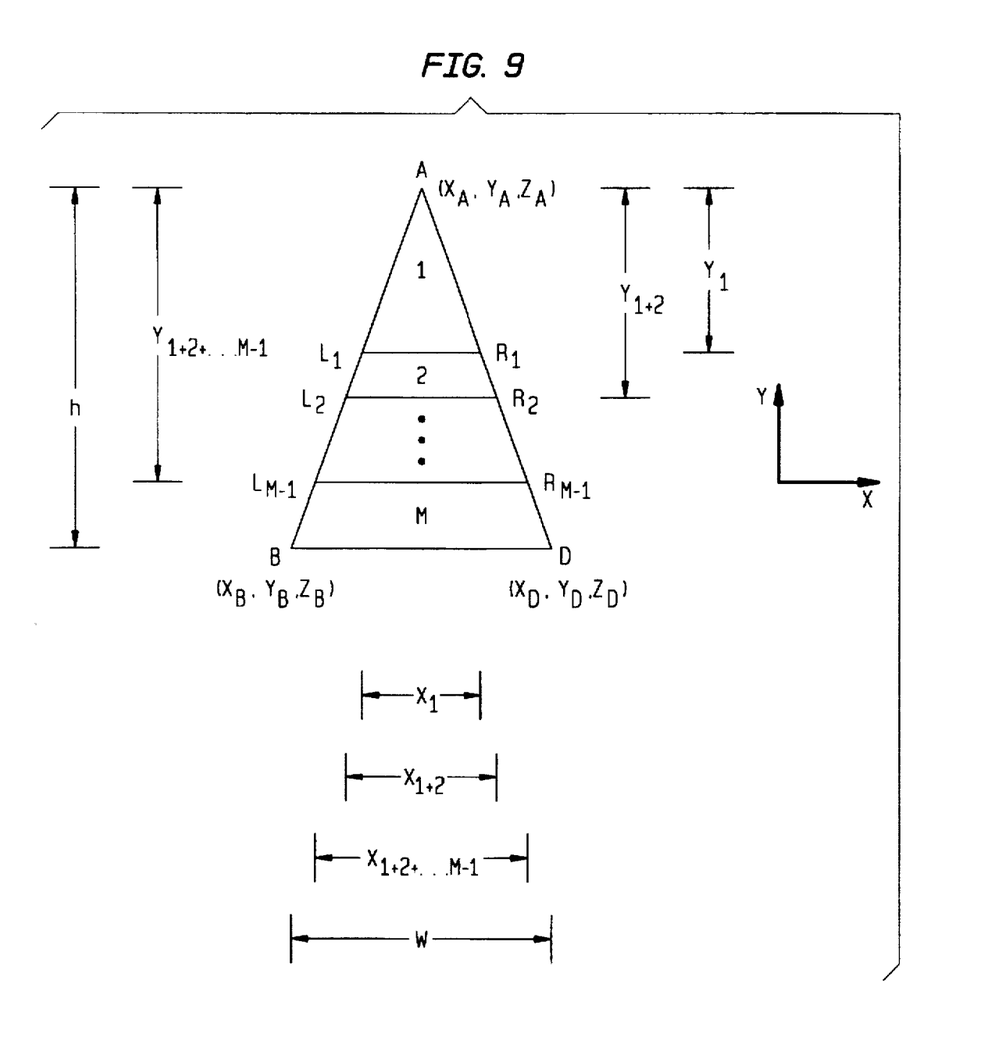
FIG. 9 illustrates the regions of the upper portion ABD determined by the region partitioning logic of FIG. 4.

Preferably, region 1 is defined as a triangle similar to the original triangle sharing the upper vertex A and having a height $y_l$ and width $x_l$ as shown in FIG. 9. Thus, region 1 is a triangle defined by the vertices A, L1 and R1. The cost $C_s$ for rasterization of region 1 may be expressed as:

where $$C_s = C_l \times y_1 \times n_1 + C_p \times \frac{1}{2} \times y_1 \times x_1 \times n_1 \times n_p \qquad (14)$$

$$x_1 = y_1 \times \frac{w}{h} \qquad (15)$$

Thus, equations (13), (14) and (15) may be combined to give:

$$\frac{1}{2} \cdot \frac{w}{h} \cdot C_p y_1^2 + C_l y_1 - \frac{q}{n} C_t + \sum_{i=1}^{q} C_e^i = 0 \qquad (16)$$

Note that equation (16) is a quadratic equation in the form $$Ay_1^2 + By_1 + C = 0 \qquad (17)$$

where $$A = \frac{1}{2} \cdot \frac{w}{h} C_p$$

$$B = C_l$$

$$C = -\frac{q}{n} C_t + \sum_{i=1}^{q} C_e^i$$

Thus, the region partitioning logic may solve for $y_1$ of region 1 as follows, where q=1 for region 1:

$$y_1 = \frac{-B \pm \sqrt{B^2 - 4AC}}{2A} \qquad (18)$$

In addition, having determined $y_1$, $x_1$ of region 1 is preferably determined by equation (15) above. The region partitioning logic 301 then uses $x_1$ and $y_1$ to determine the coordinates of the vertices L1 and R1 of region 1 as follows:

$$y_{L1} = y_{R1} = y_A - y_1 \qquad (19)$$

$$x_{L1} = m_{AB} y_{L1} + c_{AB} \qquad (20)$$

$$x_{R1} = m_{AC} y_{R1} + c_{AC} \qquad (21)$$

where $m_{AB}$, $c_{AB}$, $m_{AC}$, and $c_{AC}$ may be determined as described above with respect to equations (2) and (3). The z coordinate as well as the attributes (e.g. color, reflectance, texture, fog and others) of the vertices L1 and R1 may be determined by interpolation as described above with reference to equations (5) to (8).

In step 505, the region partitioning logic 301 determines the coordinates and attributes of the vertices of region 2 based upon the rasterization cost $C_s$ of the regions 1 and 2 and the cost $C_r$. Preferably, region 2 is a subset of a region designated (1+2) that is defined as a triangle similar to the original triangle sharing the upper vertex A and having a height $y_{1+2}$ and width $x_{1+2}$ as shown in FIG. 9. Thus, region (1+2) is preferably a triangle defined by the vertices A, L2 and R2, and region 2 is preferably a trapezoid defined by the vertices L1 and R1 of region 1 and the vertices L2 and R2 of the region (1+2).

The cost $C_s$ for the rasterization of regions 1 and 2 is expressed in equation (9) where q=2. The y-coordinate of region (1+2), designated $y_{(1+2)}$, can be solved using equation (14) where q=2. The x-coordinate of region (1+2), designated $x_{(1+2)}$, is given by equation (11). The region partitioning logic may then use $x_{(1+2)}$ and $y_{(1+2)}$ of region (1+2) to determine the coordinates of the vertices L2 and R2 of region (1+2) as follows:

$$y_{L2}=y_{R2}=y_A-y_{(1+2)} \quad (18)$$

$$x_{L2}=m_{AB}y_{L2}+c_{AB} \quad (19)$$

$$x_{R2}=m_{AC}y_{R2}+c_{AC} \quad (20)$$

where $m_{AB}$, $c_{AB}$, $m_{AC}$, and $c_{AC}$ may be determined as described above with respect to equations (2) and (3).

Thus, the coordinates of the vertices of region 2 include the coordinates of the vertices L1 and R1 shared by region 1 and the coordinates of the vertices L2 and R2 as determined above. In addition, the attributes (e.g. color, reflectance, texture, fog and others) of the vertices L2 and R2 may be determined by interpolation as described above with reference to equations (5) to (8).

In steps 507 to 509, the region partitioning logic performs the same steps for each of the regions 3 . . . M-1 to determine the coordinates and attributes of the vertices that define each of the regions 3 . . . M-1. The coordinates and attributes of the vertices of region M are given by the coordinates and attributes of $L_{M-1}$, $R_{M-1}$ of the vertices of region M-1 and the coordinates and attributes of the vertices B and D of the upper portion ABD.

In order to partition the lower portion CBD into non-overlapping regions 1, 2, . . . M each having equal cost of rasterization, the region partition logic 301 applies the same steps as described above with respect to FIG. 8 to the lower portion CBD.

Through the partitioning of primitives into regions having equal rasterization cost, the parallel rasterization mechanism describe above provides for efficient load balance among the rasterization engines. Moreover, the regions preferably do not overlap one another, which avoids z-buffer contention, and thus reduces the complexity and cost of the system.

Other embodiments of the invention will be apparent to those skilled in the art from consideration of the specification and practice of the invention disclosed herein. It is intended that the specification and examples be considered as examples only, with the true scope of the invention being indicated by the claims.

I claim:

1. A method for rasterizing an object for display utilizing a plurality of rasterization engines, wherein the object is represented by a plurality of faces, the method comprising the steps of:

partitioning at least one face of said object into a plurality of sub-faces according to a first cost function representing cost of rasterizing said face; and assigning said sub-faces to said plurality of rasterization engines for rasterization.

2. The method of claim 1, further comprising the step of rasterizing each of said sub-faces to generate pixel data representing said object for display.

3. The method of claim 1, wherein said at least one face of said object is partitioned into said plurality of sub-faces according to a second cost function representing cost of rasterizing at least one of said sub-faces.

4. The method of claim 3, wherein each of said sub-faces has equal rasterization cost.

5. The method of claim 4, wherein said sub-faces do not overlap one another.

6. The method of claim 4, wherein each of said faces of said object is a triangular region defined by coordinates of three vertices.

7. The method of claim 6, wherein said first cost function is of the form:

$$C_t = C_l \times N_l + C_p \times N_p$$

wherein $C_t$ is the cost of rasterizing said at least one face, $C_l$ is the cost of rasterizing a given scan line, $C_p$ is the cost of rasterizing a given pixel, $N_l$ is the total number of scan lines in said at least one face and $N_p$ is the total number of pixels covered by said at least one face.

8. The method of claim 6, wherein said first cost function is of the form:

$$C_t = C_l \times h \times n_l + C_p \times \frac{1}{2} \times h \times w \times n_l \times n_h$$

wherein $C_t$ is the cost of rasterizing said at least one face, $C_l$ is the cost of rasterizing a given scan line, $C_p$ is the cost of rasterizing a given pixel, h is a height of said at least one face, w is a width of said at least one face, $n_l$ is the number of scan lines per unit height and $n_p$ is the number of pixels per unit length.

9. The method of claim 4, wherein one of said sub-faces of said one face is a planar trapezoidal region defined by coordinates of four vertices.

10. The method of claim 4, wherein one of said sub-faces of said at least one face is a triangular region defined by coordinates of three vertices.

11. The method of claim 10, wherein said second cost function is of the form:

$$C_s = \frac{q}{N} \times C_t + \sum_{i=1}^{q} C_e^i$$

where $C_s$ represents cost of rasterizing a number of sub-faces, q represents said number of sub-faces, $C_T$ is a cost of rasterizing said at least one face as determined by said first cost function, and $C_e^i$ is an adjustment cost associated with region i if the rasterization of sub-face i does not start at the same time as the rasterization of other sub-faces.

12. The method of claim 10, wherein said second cost function is of the form:

$$C_s = C_l \times h \times n_l + C_p \times \frac{1}{2} \times h \times w \times n_l \times n_h$$

wherein $C_s$ represents cost of rasterizing a number of sub-faces, $C_l$ is the cost of rasterizing a given scan line, $C_p$ is the cost of rasterizing a given pixel, h is a height of said number of sub-faces, w is a width of said number of sub-faces, $n_l$ is the number of scan lines per unit height and $n_p$ is the number of pixels per unit length.

13. An apparatus for rasterizing an object for display utilizing a plurality of rasterization engines, wherein the object is represented by a plurality of faces, the apparatus comprising:

means for partitioning at least one face of said object into a plurality of sub-faces according to a first cost function representing cost of rasterizing said face; and means assigning said sub-faces to said plurality of rasterization engines for rasterization.

14. The apparatus of claim 13, wherein said plurality of rasterization engines rasterize said sub-faces to generate pixel data representing said object for display.

15. The apparatus of claim 13, wherein said at least one face of said object is partitioned into said plurality of sub-faces according to a second cost function representing cost of rasterizing at least one of said sub-faces.

16. The apparatus of claim 13, wherein each of said sub-faces has equal rasterization cost.

17. The apparatus of claim 16, wherein said sub-faces do not overlap one another.

18. The apparatus of claim 16, wherein each of said faces of said object is a triangular region defined by coordinates of three vertices.

19. The apparatus of claim 18, wherein said first cost function is of the form:

$$C_f = C_l \times N_l + C_p \times N_p$$

wherein $C_f$ is the cost of rasterizing said at least one face, $C_l$ is the cost of rasterizing a given scan line, $C_p$ is the cost of rasterizing a given pixel, $N_l$ is the total number of scan lines in said at least one face and $N_p$ is the total number of pixels covered by said at least one face.

20. The apparatus of claim 18, wherein said first cost function is of the form:

$$C_f = C_l \times h \times n_l + C_p \times \frac{1}{2} \times h \times w \times n_l \times n_h$$

wherein $C_f$ is the cost of rasterizing said at least one face, $C_l$ is the cost of rasterizing a given scan line, $C_p$ is the cost of rasterizing a given pixel, h is a height of said at least one face, w is a width of said at least one face, $n_l$ is the number of scan lines per unit height and $n_p$ is the number of pixels per unit length.

21. The apparatus of claim 16, wherein one of said sub-faces of said one face is a planar trapezoidal region defined by coordinates of four vertices.

22. The apparatus of claim 16, wherein one of said sub-faces of said at least one face is a triangular region defined by coordinates of three vertices.

23. The apparatus of claim 22, wherein said second cost function is of the form:

$$C_s = \frac{q}{N} \times C_t + \sum_{i=1}^{q} C_e^i$$

where $C_s$ represents cost of rasterizing a number of sub-faces, q represents said number of sub-faces, $C_T$ is a cost of rasterizing said at least one face as determined by said first cost function, and $C_e^i$ is an adjustment cost associated with region i if the rasterization of sub-face i does not start at the same time as the rasterization of other sub-faces.

24. The apparatus of claim 22, wherein said second cost function is of the form:

$$C_s = C_1 \times h \times n_l + C_p \times \frac{1}{2} \times h \times w \times n_l \times n_h$$

wherein $C_s$ represents cost of rasterizing a number of sub-faces, $C_l$ is the cost of rasterizing a given scan line, $C_p$ is the cost of rasterizing a given pixel, h is a height of said number of sub-faces, w is a width of said number of sub-faces, $n_l$ is the number of scan lines per unit height and $n_p$ is the number of pixels per unit length.

25. A program storage device readable by a machine, tangibly embodying a program of instructions executable by the machine to perform method steps for rasterizing an object for display utilizing a plurality of rasterization engines, wherein the object is represented by a plurality of faces, the method steps comprising:

partitioning at least one face of said object into a plurality of sub-faces according to a first cost function representing cost of rasterizing said face; and assigning said sub-faces to said plurality of rasterization engines for rasterization.

26. The program storage device of claim 25, further comprising the step of rasterizing each of said sub-faces to generate pixel data representing said object for display.

27. The program storage device of claim 25, wherein said at least one face of said object is partitioned into said plurality of sub-faces according to a second cost function representing cost of rasterizing at least one of said sub-faces.

28. The program storage device of claim 25, wherein each of said sub-faces has equal rasterization cost.

29. The program storage device of claim 28, wherein said sub-faces do not overlap one another.

30. The program storage device of claim 28, wherein each of said faces of said object is a triangular region defined by coordinates of three vertices.

31. The program storage device of claim 30, wherein said first cost function is of the form:

$$C_f = C_l \times N_l + C_p \times N_p$$

wherein $C_f$ is the cost of rasterizing said at least one face, $C_l$ is the cost of rasterizing a given scan line, $C_p$ is the cost of rasterizing a given pixel, $N_l$ is the total number of scan lines in said at least one face and $N_p$ is the total number of pixels covered by said at least one face.

32. The program storage device of claim 30, wherein said first cost function is of the form:

$$C_f = C_1 \times h \times n_l + C_p \times \frac{1}{2} \times h \times w \times n_l \times n_h$$

wherein $C_f$ is the cost of rasterizing said at least one face, $C_l$ is the cost of rasterizing a given scan line, $C_p$ is the cost of rasterizing a given pixel, h is a height of said at least one face, w is a width of said at least one face, $n_l$ is the number of scan lines per unit height and $n_p$ is the number of pixels per unit length.

33. The program storage device of claim 28, wherein one of said sub-faces of said one face is a planar trapezoidal region defined by coordinates of four vertices.

34. The program storage device of claim 28, wherein one of said sub-faces of said at least one face is a triangular region defined by coordinates of three vertices.

35. The program storage device of claim 34, wherein said second cost function is of the form:

$$C_s = \frac{q}{N} \times C_t + \sum_{i=1}^{q} C_e^i$$

where $C_s$ represents cost of rasterizing a number of sub-faces, q represents said number of sub-faces, $C_T$ is a cost of rasterizing said at least one face as determined by said first cost function, and $C_e^i$ is an adjustment cost associated with region i if the rasterization of sub-face i does not start at the same time as the rasterization of other sub-faces.

36. The program storage device of claim 34, wherein said second cost function is of the form:

$$C_s = C_l \times h \times n_l + C_p \times \frac{1}{2} \times h \times w \times n_l \times n_h$$

wherein $C_s$ represents cost of rasterizing a number of sub-faces, $C_l$ is the cost of rasterizing a given scan line, $C_p$ is the cost of rasterizing a given pixel, h is a height of said number of sub-faces, w is a width of said number of sub-faces, $n_l$ is the number of scan lines per unit height and $n_p$ is the number of pixels per unit length.

* * * * *